United States Patent
Chikahisa

(10) Patent No.: US 9,888,220 B2
(45) Date of Patent: Feb. 6, 2018

(54) LIGHT SOURCE DEVICE, PROJECTION-TYPE DISPLAY DEVICE, AND LIGHT GENERATION METHOD

(71) Applicant: NEC Display Solutions, Ltd., Tokyo (JP)

(72) Inventor: Shinichiro Chikahisa, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 0 days.

(21) Appl. No.: 15/098,181

(22) Filed: Apr. 13, 2016

(65) Prior Publication Data

US 2016/0353069 A1    Dec. 1, 2016

(30) Foreign Application Priority Data

Jun. 1, 2015    (JP) .................................. 2015-111403

(51) Int. Cl.
*H04N 9/31* (2006.01)

(52) U.S. Cl.
CPC ......... *H04N 9/3158* (2013.01); *H04N 9/3161* (2013.01); *H04N 9/3164* (2013.01)

(58) Field of Classification Search
CPC .. H04N 9/3158; G03B 21/204; G03B 21/142; G03B 21/208
USPC ....................................................... 353/121
See application file for complete search history.

(56) References Cited

U.S. PATENT DOCUMENTS

2016/0026076 A1*  1/2016  Hu ........................ G03B 21/204
                                                                  353/84

FOREIGN PATENT DOCUMENTS

| JP | 407318922 | * 12/1995 | ........... G02F 1/1335 |
| WO | WO 2014/115493 A1 | 7/2014 | |
| WO | WO 2014/196020 A1 | 12/2014 | |

OTHER PUBLICATIONS

Translation of abstract in 407318922.*

* cited by examiner

*Primary Examiner* — Steven H Whitesell Gordon
*Assistant Examiner* — Jerry Brooks
(74) *Attorney, Agent, or Firm* — McGinn I.P. Law Group, PLLC

(57) ABSTRACT

A light source device capable of improve energy efficiency is provided. A light source device includes a yellow phosphor that emits yellow fluorescence excited by exciting light, a red laser light source that emits red laser light, a first light combining unit that generates first composite light by combining the emitted yellow fluorescence with the emitted red laser light, a blue laser light source that emits blue laser light, and a second light combining unit that generates second composite light by combining the combined first composite light with the emitted blue laser light.

6 Claims, 8 Drawing Sheets

LIGHT SOURCE DEVICE, PROJECTION-TYPE DISPLAY DEVICE, AND LIGHT GENERATION METHOD

INCORPORATION BY REFERENCE

This application is based upon and claims the benefit of priority from Japanese patent application No. 2015-111403, filed on Jun. 1, 2015, the disclosure of which is incorporated herein in its entirety by reference.

BACKGROUND OF THE INVENTION

1. Technical Field

The present invention relates to a light source device, a projection-type display device, and a light generation method. In particular, the present invention relates to a light source device including a phosphor and a laser light source, a projection-type display device, and a light generation method.

2. Background Art

Recently, light sources for projectors, which are projection-type display devices, have been increasingly shifted from lamps to solid-state light sources in view of their reliability, stability, and fast start-up characteristic. There are various solid-state light source methods including a method in which a laser is used for each of three colors, a method in which a phosphor(s) and a laser(s) are used, and a method in which a phosphor(s) and an LED(s) are used. For example, in projectors for digital cinemas in which images are projected on large screens, since they need to have a high power, the use of three color lasers, or an apparatus in which a phosphor(s) is combined with a laser(s) has been proposed.

Examples of known related art include International Patent Publications No. WO2014/196020 and No. WO2014/115493.

SUMMARY

Among the solid-state light sources, while the blue laser is relatively inexpensive and has a high power, the green laser and the red laser are relatively expensive and have a low power. Further, since the green and red lasers exhibit a large dependence on the temperature, they require strong cooling. Therefore, when the three colors lasers are used, the apparatus becomes expensive and large in size. Therefore, related art proposes a method in which a small apparatus having a high power is obtained at a relatively low cost by combining, for example, a yellow phosphor with a blue laser (e.g., International Patent Publications No. WO2014/196020 and No. WO2014/115493).

As described previously, a digital cinema requires a high power and its color gamut has been standardized. FIG. 1 is an xy-chromaticity diagram showing a color gamut standardized in the digital cinema and FIG. 2 shows an intensity distribution over wavelengths corresponding to the color gamut.

As shown in FIG. 1, in the digital cinema, the single colors need to meet the respective targets 901a to 901c indicated by square frames indicated by solid lines. In the case of the configuration in which a yellow phosphor is combined with a blue laser as in the case of the above-described related art, the color gamut 902 indicated by solid lines in FIG. 1 is obtained. In this case, the wavelength has a spectral characteristic 904 indicated by a solid line in FIG. 2.

In the related art, to meet the digital cinema standard, it is necessary to cut (i.e., filter out) parts of the wavelength band by using a filter or the like so that the spectral characteristic is changed from the spectral characteristic 904 to a spectral characteristic 905 indicated by a dotted line in FIG. 2. By doing so, it is possible to conform a color to the target color gamut for the digital cinema as shown as a color gamut 903 indicated by dotted lines in FIG. 1.

As described above, the related art improves the efficiency of the apparatus by using the yellow phosphor and the blue laser. However, since it is necessary to make corrections in order to conform a color to the target color gamut for the digital cinema or the like, the efficiency is impaired. Therefore, in the related art, there is a problem that it is very difficult to make it possible to increase the power by reducing the energy loss, i.e., to improve the energy efficiency.

The present invention has been made in view of the above-described problem and an object thereof is to provide a light source device, a projection-type display device, and a light generation method capable of improve the energy efficiency.

A first aspect of the present invention is a light source device including: a yellow phosphor that emits yellow fluorescence excited by exciting light; a red laser light source that emits red laser light; a first light combining unit that generates first composite light by combining the emitted yellow fluorescence with the emitted red laser light; a blue laser light source that emits blue laser light; and a second light combining unit that generates second composite light by combining the combined first composite light with the emitted blue laser light.

Another aspect of the present invention is a projection-type display device including: a yellow phosphor that emits yellow fluorescence excited by exciting light; a red laser light source that emits red laser light; a first light combining unit that generates first composite light by combining the emitted yellow fluorescence with the emitted red laser light; a blue laser light source that emits blue laser light; a second light combining unit that generates second composite light by combining the combined first composite light with the emitted blue laser light; a filter that filters out light having a predetermined wavelength from the combined second composite light; and a projection unit that projects image light based on light that has passed through the filter.

Another aspect of the present invention is a light generating method including: emitting yellow fluorescence excited by exciting light; emitting red laser light by a red laser light source; generating first composite light by combining the emitted yellow fluorescence with the emitted red laser light; emitting blue laser light by a blue laser light source; and generating second composite light by combining the combined first composite light with the emitted blue laser light.

The above and other objects, features and advantages of the present invention will become more fully understood from the detailed description given hereinbelow and the accompanying drawings which are given by way of illustration only, and thus are not to be considered as limiting the present invention.

EXEMPLARY EMBODIMENTS

Outline of Exemplary Embodiment

Figure 10:
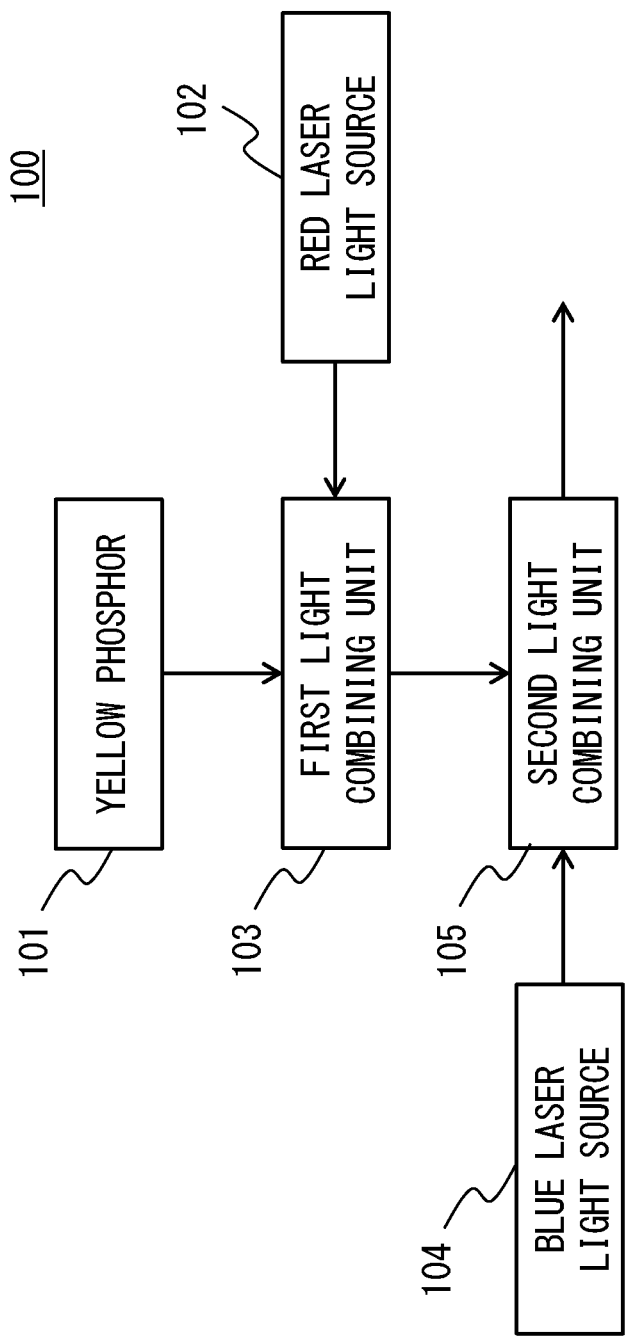
FIG. 10 is a configuration diagram showing an outline of a light source device according to an exemplary embodiment.

FIG. 10 is a configuration diagram showing an outline of a light source device according to an exemplary embodiment. As shown in FIG. 10, a light source device 100 according to the exemplary embodiment includes a yellow phosphor 101, a red laser light source 102, a first light combining unit 103, a blue laser light source 104, and a second light combining unit 105.

The yellow phosphor 101 is a phosphor that emits yellow fluorescence excited by exciting light. The red laser light source 102 is a light source that emits red laser light. The first light combining unit 103 generates first composite light by combining the yellow fluorescence emitted by the yellow phosphor 101 with the red laser light emitted by the red laser light source 102.

The blue laser light source 104 is a light source that emits blue laser light. The second light combining unit 105 generates second composite light by combining the first composite light generated by the first light combining unit 103 with the blue laser light emitted by the blue laser light source 104.

As described above, the exemplary embodiment uses the red laser in addition to the yellow phosphor and the blue laser in order to generate white light. As a result, for example, it is possible to eliminate or reduce the need for the correction which would otherwise be necessary to conform the obtained color to the color specified for the digital cinema or the like and thereby improve the energy efficiency.

That is, the exemplary embodiment uses the red laser for the color adjustment in order to conform the color gamut to each single color target for, for example, the digital cinema. In this way, the energy loss is reduced by including the wavelength band of the yellow phosphor which should otherwise be partially filtered out, thus making it possible to provide an apparatus having high efficiency. Further, the use of a trichroic mirror to combine the red laser with the phosphor in the exemplary embodiment reduces the number of necessary components, thus making it also possible to provide a compact configuration.

First Exemplary Embodiment

Figure 3:
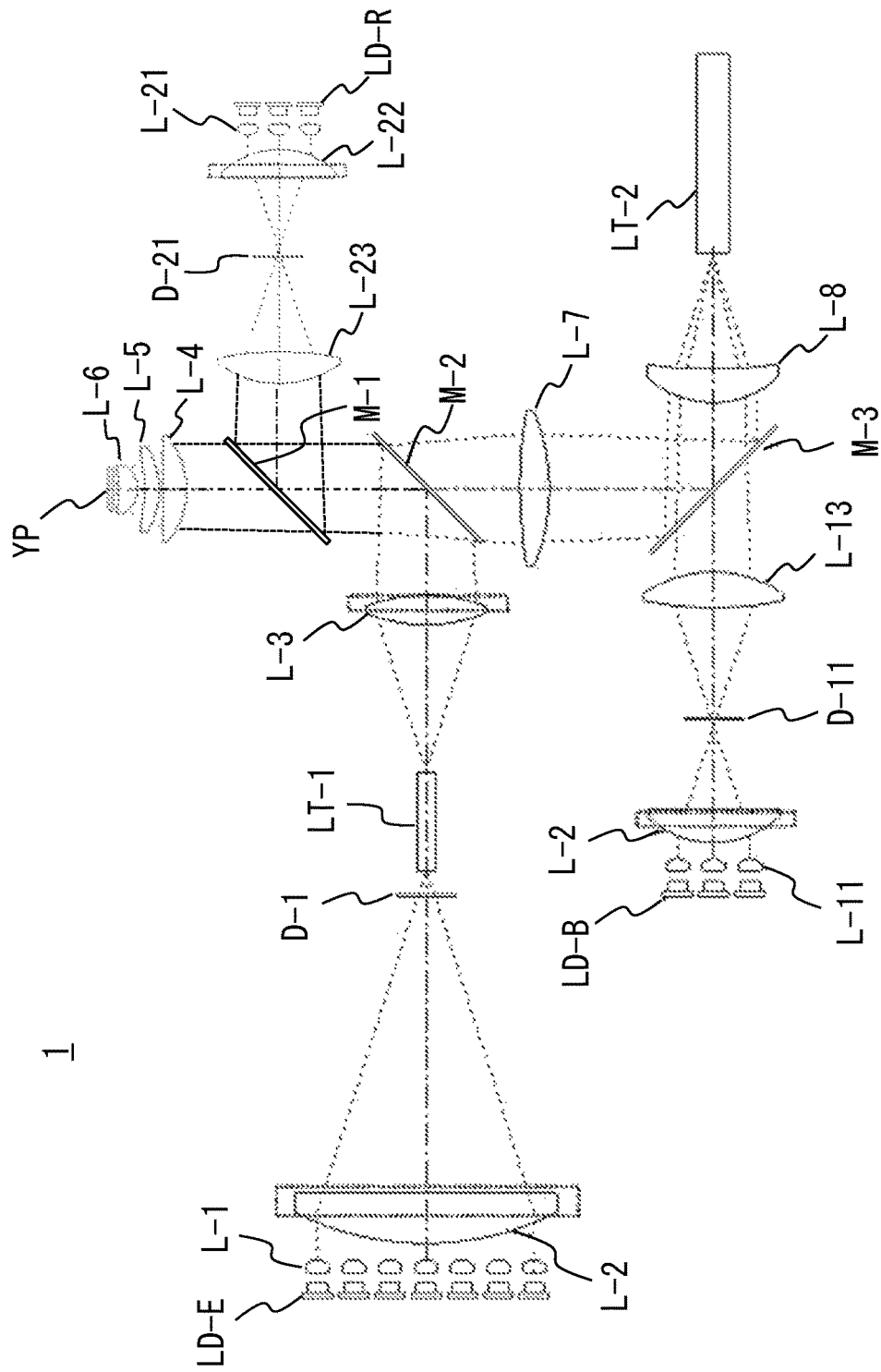
FIG. 3 is a configuration diagram showing a general configuration of a white light generation unit (light source device) according to a first exemplary embodiment.
Figure 4:
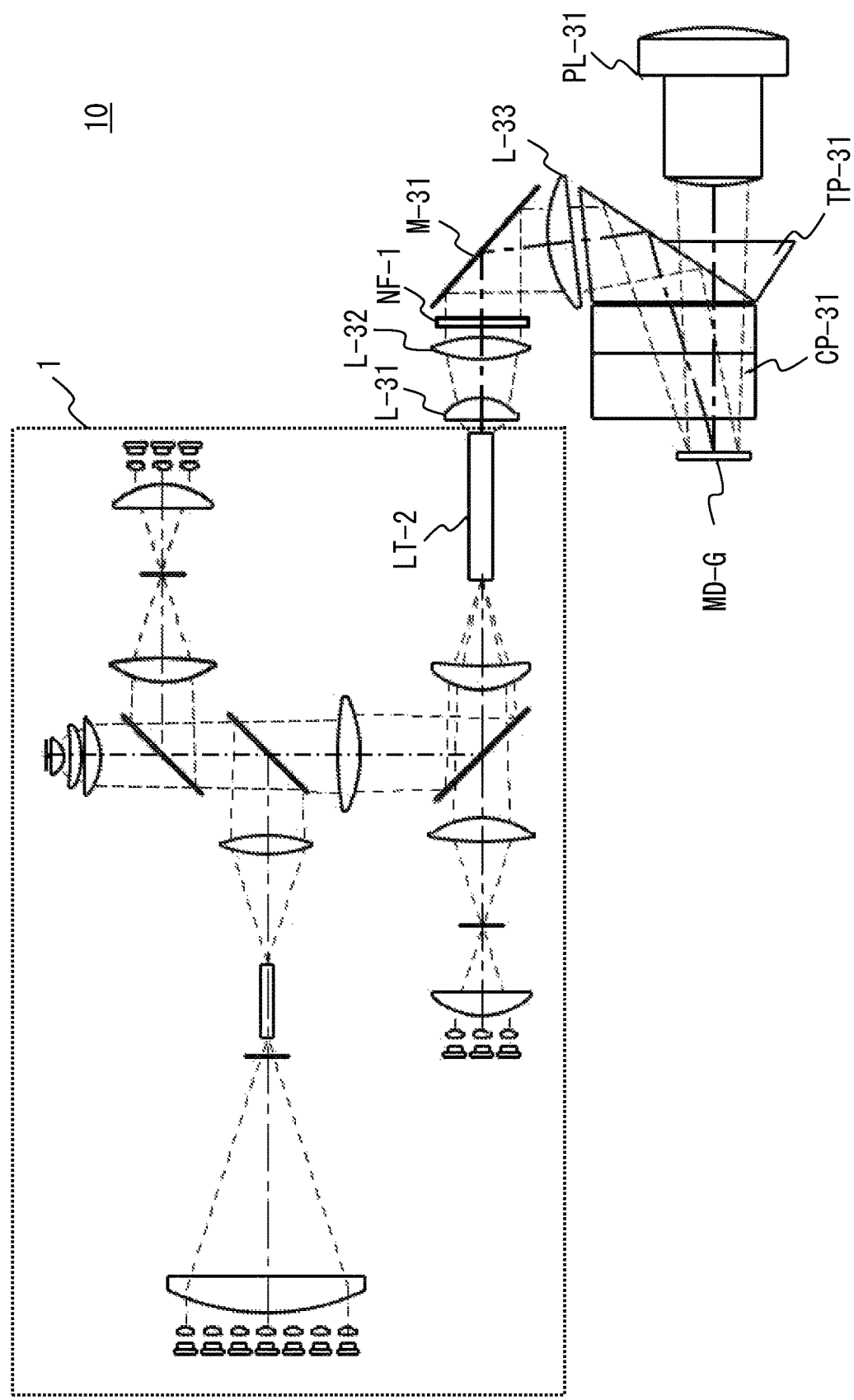
FIG. 4 is a configuration diagram sowing a general configuration of a projector according to the first exemplary embodiment.

A first exemplary embodiment is explained hereinafter with reference to the drawings. This exemplary embodiment uses a yellow phosphor, a blue laser, and a red laser as light sources as described above. FIG. 3 shows a configuration example of a white light generation unit (light source device) according to this exemplary embodiment, and FIG. 4 shows a configuration example of a projector including this white light generation unit.

As shown in FIG. 3, the white light generation unit 1 according to this exemplary embodiment mainly includes, as a light source system for generating light of each color, blue laser diodes LD-Es, a phosphor YP, red laser diodes LD-Rs, and blue laser diodes LD-Bs. Further, the white light generation unit 1 includes, as a composite optical system for combining light from these components, dichromic mirrors M-1, M-2 and M-3. The dichromic mirrors M-1 and M-2 form a first light combining unit that generates first composite light by combining the yellow fluorescence with the red laser light, and the dichromic mirror M-3 forms a second combining unit that generates second composite light by combining the first composite light with the blue laser light.

Lenses L-1 and L-2, a diffusion plate D-1, a light tunnel LT-1, and a lens L-3 are provided between the blue laser diodes LD-Es (an exciting laser light source) and the dichromic mirror M-2 (a second dichromic mirror) that reflects light (exciting laser light) from the blue laser diodes LD-Es.

That is, a plurality of blue laser diodes LD-Es are arranged on a plane (i.e., two-dimensionally arranged) as a light source for exciting the phosphor. Blue laser light emitted from the blue laser diodes LD-Es is converted into collimated light (or parallel light) by the lens L-1. The light collimated by the lens L-1 is concentrated onto an incident opening of the light tunnel LT-1 by the lens L-2. The diffusion plate D-1, which diffuses the incident light, is disposed between the lens L-2 and the light tunnel LT-1.

For example, the light tunnel LT-1 is a hollow optical element in which each of the upper, lower, left and right internal surfaces is formed as a reflecting mirror. Alternatively, a glass rod (a rod integrator) having the same shape as the hollow portion may be used. The blue laser light that has entered the light tunnel LT-1 is reflected on the internal surfaces of the light tunnel a plurality of times and hence the illumination distribution at the exit part of the light tunnel is uniformed. The blue laser light that has exited from the light tunnel LT-1 passes through the lens L-3 and is incident on the dichromic mirror M-2.

Lenses L-5 and L-4, dichromic mirrors M-1 and M-2, and a lens L-7 are provided between the phosphor YP and the dichromic mirror M-3 that reflects light from the phosphor YP and the red laser diodes LD-Rs.

The dichromic mirror M-1 has a characteristic by which yellow color passes therethrough and a red long-wavelength band is reflected thereon. Therefore, the wavelength band of the yellow light from the phosphor YP passes through the dichromic mirror M-1 and the wavelength band of the red light from the red laser diodes LD-Rs is reflected on the dichromic mirror M-1. The dichromic mirror M-2 has a characteristic by which blue color is reflected thereon and yellow color passes therethrough. Therefore, the wavelength band of the blue light from the blue laser diodes LD-Es, which is exciting light, is reflected on the dichromic mirror M-2 and the wavelength bands of the yellow light and the red light from the phosphor YP and the red laser diodes LD-Rs, respectively, pass through the dichromic mirror M-2. Therefore, the dichromic mirror M-2 reflects the incident blue laser light toward the dichromic mirror M-1 and the reflected blue laser light passes through the dichromic mirror M-1. Further, the blue laser light passes through the lenses L-4, L-5 and L-6 and illuminates the phosphor YP. The phosphor YP emits yellow light, which is excited by the blue light, to the dichromic mirror M-1 through the lenses L-6, L-5 and L-4.

Lenses L21 and L-22, a diffuser D-21, and a lens L-23 are provided between the red laser diodes LD-Rs and the dichromic mirror M-1 (a first dichromic mirror) that reflects light from the red laser diodes LD-Rs.

That is, a plurality of red laser diodes LD-Rs are arranged on a plane (i.e., two-dimensionally arranged) as a light source for red color. Red laser light emitted from the red laser diodes LD-Rs is converted into collimated light (or parallel light) by the lens L-21. The light collimated by the lens L-21 is concentrated by the lens L-22. The diffuser D-21 is disposed at or near the concentration part (the focal point) by the lens L-22, so that the diffuser D-21 diffuses the red laser light. The red light diffused by the diffuser D-21 passes through the lens L-23 and is incident on the dichromic mirror M-1.

The dichromic mirror M-1 lets the yellow light from the phosphor YP pass therethrough in a first combining direction (a direction toward the dichromic mirror M-3) and reflects the red light incident from the lens L-23 toward the dichromic mirror M-2 (i.e., in the first combining direction). By doing so, the dichromic mirror M-1 combines the yellow light with the red light. The dichromic mirror M-2 lets the resultant light, in which the yellow light and the red light are combined, pass therethrough in the first combining direction. Further, the resultant light passes through the lens L-7 and is incident on the dichromic mirror M-3.

Lenses L-11 and L-12, a diffuser D-11, a lens L-13, a dichromic mirror M-3, and a lens L-8 are provided between the blue laser diodes LD-Bs and a light tunnel LT-2 that outputs light from the blue laser diodes LD-Bs, the phosphor YP, and the red laser diodes LD-Rs.

That is, a plurality of blue laser diodes LD-Bs are arranged on a plane (i.e., two-dimensionally arranged) as a light source for blue color. Blue laser light emitted from the blue laser diodes LD-Bs is converted into collimated light (or parallel light) by the lens L-11. The light collimated by the lens L-11 is concentrated by the lens L-12. The diffuser D-11 is disposed at or near the concentration part (the focal point) by the lens L-12, so that the diffuser D-11 diffuses the blue laser light. The blue light diffused by the diffuser D-11 passes through the lens L-13 and is incident on the dichromic mirror M-3.

The dichromic mirror M-3 has a characteristic by which blue color passes therethrough and yellow color is reflected thereon. Therefore, the wavelength band of the blue light from the blue laser diodes LD-Bs passes through the dichromic mirror M-3 and the wavelength bands of the yellow light and the red light from the phosphor YP and the red laser diodes LD-Rs, respectively, are reflected on the dichromic mirror M-3. Therefore, the dichromic mirror M-3 lets the blue light incident from the lens L-13 pass therethrough in a second combining direction (a direction toward the light tunnel LT-2) and reflects the yellow and red light incident from the lens L-7 toward the lens L-8 (i.e., in the second combining direction). By doing so, the dichromic mirror M-3 combines the blue light with the yellow and red light. The resultant light from the dichromic mirror M-3 passes through the lens L-8 and enters the light tunnel LT-2. The light that enters the light tunnel LT-2 is the light in which the yellow light, blue light, and red light are combined, and they are made uniform through the light tunnel LT-2 and output from the light tunnel LT-2 as white light.

As shown in FIG. 4, a projector 10 according to this exemplary embodiment mainly includes: the white light generation unit 1 shown in FIG. 3; a mirror M-31, a TIR prism TP-31, and a color prism CP-31 that reflect and spectrally disperse the generated white light; a digital mirror device (DMD) MD-G (and MD-R and MD-B) that generates image light from the spectrally-dispersed light; and a projection lens PL-31 that projects the generated image light.

Further, lens L-31 and L32 and a filter NF-1 are provided between the light tunnel LT-2 of the white light generation unit 1 and the mirror M-31, and a lens L-33 is provided between the mirror M-31 and the TIR prism TP-31.

The white light, which has exited from the light tunnel LT-2, passes through the lenses L-31 and L-32, and after a predetermined wavelength(s) is filtered out by the filter NF-1, is incident on the mirror M-31. The mirror M-31 reflects the incident white light, and the reflected light passes through the lens L-33 and enters the TIR prism TP-31. The light that has entered the TIR prism TP-31 is totally reflected inside the prism and enters the color prism CP-31. The color prism CP-31 is a prism that spectrally disperses white light into green, red, and blue light. In FIG. 4, only the optical path of the green light is shown and those of the red and blue light are omitted.

The green light, which is obtained by the spectral dispersion by the color prism SP-31, is incident on the digital mirror device MD-G for the green light. The green light incident on the digital mirror device MD-G is reflected on the digital mirror device MD-G while its beam angle is changed according to the pixel of the image, and enters the color prism CP-31 again. Similarly, the red light and the blue light, which are obtained by the spectral dispersion by the color prism SP-31, are incident on the digital mirror device MD-R (not shown) for the red light and the digital mirror device MD-B (not shown) for the blue light, respectively. Then, they are reflected on the digital mirror devices MD-G and MD-B while their beam angles are changed according to the pixel of the image, and enter the color prism CP-31 again.

The green light, red light, and blue light that have entered the color prism CP-31 are combined with each other in the color prism CP-31 and the combined light enters the TIR prism TP-31. The light that has entered from the color prism CP31 passes through the TIR prism TP-31, enters the projection lens PL-31, and is projected from the projection lens PL-31 onto a screen in a magnified manner.

Figure 1:
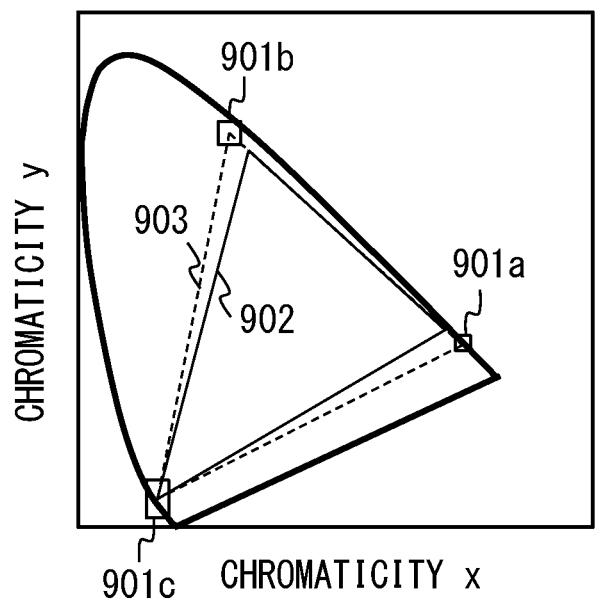
FIG. 1 is a chromaticity diagram showing a color gamut of light according to related art.
Figure 2:
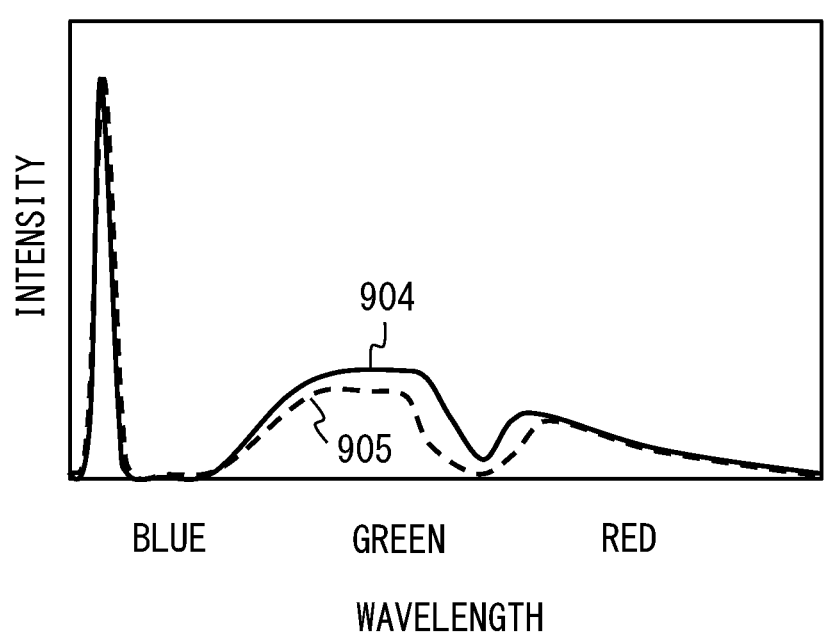
FIG. 2 is a graph showing an intensity distribution of light over wavelengths according to the related art.

Advantageous effects of this exemplary embodiment are explained hereinafter. When a yellow phosphor is combined with a blue laser diode as in the case of the related art, the obtained light projected onto the screen has the spectral characteristic 904 indicated by the solid line in FIG. 2. For example, when each of the single colors (blue, red and green) is adjusted to its target for the digital cinema by disposing a filter that filters out a part(s) of the wavelength like the filter NF-1 shown in FIG. 4 between the light tunnel LT-2 and the color prism CP-31, the obtained light has the spectral characteristic 905 indicted by the broken line in FIG. 2.

Figure 5:
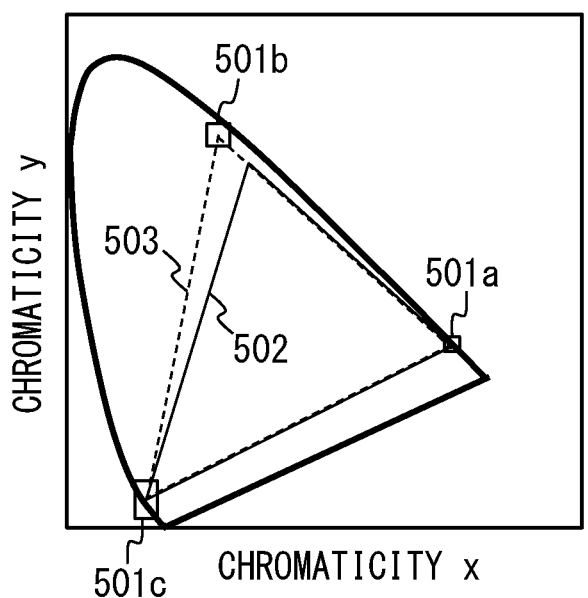
FIG. 5 is a chromaticity diagram showing a color gamut of light according to the first exemplary embodiment.
Figure 6:
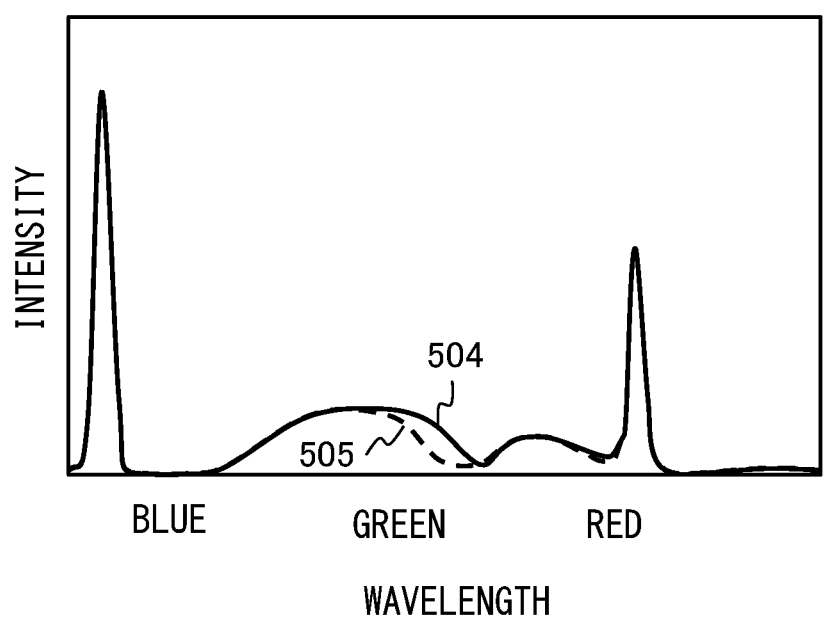
FIG. 6 is a graph showing an intensity distribution of light over wavelengths according to the first exemplary embodiment.

FIG. 5 shows a color gamut in this exemplary embodiment and FIG. 6 shows an intensity distribution over wavelengths corresponding to the color gamut. In this exemplary embodiment, a color gamut 502 indicated by a solid line in FIG. 5 is obtained by adding a red laser diode, and a spectral characteristic 504 indicated by a solid line in FIG. 6 is obtained. When this color gamut is adjusted to the target color for the digital cinema, a color gamut 503 indicated by a broken line in FIG. 5 is obtained and a spectral characteristic 505 indicated by a broken line in FIG. 6 is obtained. This exemplary embodiment is characterized in that in order to include the part of the long wavelength side band shown in FIG. 2 that is filtered out in the related art, the long wavelength in the red band is supplemented by the LD as shown in FIG. 6. Therefore, in this exemplary embodiment, it is unnecessary to perform the filtering-out by the color adjustment on the long wavelength side as shown in FIG. 6. Note that there are cases where the spectrum components of the yellow fluorescence and the red laser light, which are combined in this exemplary embodiment, may partially overlap each other. For example, there are cases where the yellow fluorescence has a spectrum component on the long-wavelength side. In such cases, when the yellow fluorescence is combined with the red laser light, some spectrum components of the yellow fluorescence are filtered out. The combination in this exemplary embodiment includes such cases where the yellow fluorescence from which some spectrum components are filtered out is combined with the red laser light.

By adopting the configuration according to this exemplary embodiment, it is possible to reduce the exciting energy for the yellow phosphor necessary for achieving the same amount of light as that in the related art so that it is about 60% of the exciting energy necessary in the related art. Further, it is possible to improve (i.e., reduce) the energy loss that occurs in the target color adjustment from about 40% to about 10%. As a result, it is possible to reduce the necessary amount of light in the whole apparatus so that it is about 60 to 70% of the amount of light necessary in the related art. Further, as a secondary advantageous effect, it is possible to obtain an effect of reducing speckles by mixing fluorescence light having a wide wavelength band with red light emission by the red laser light alone.

Second Exemplary Embodiment

Figure 7:
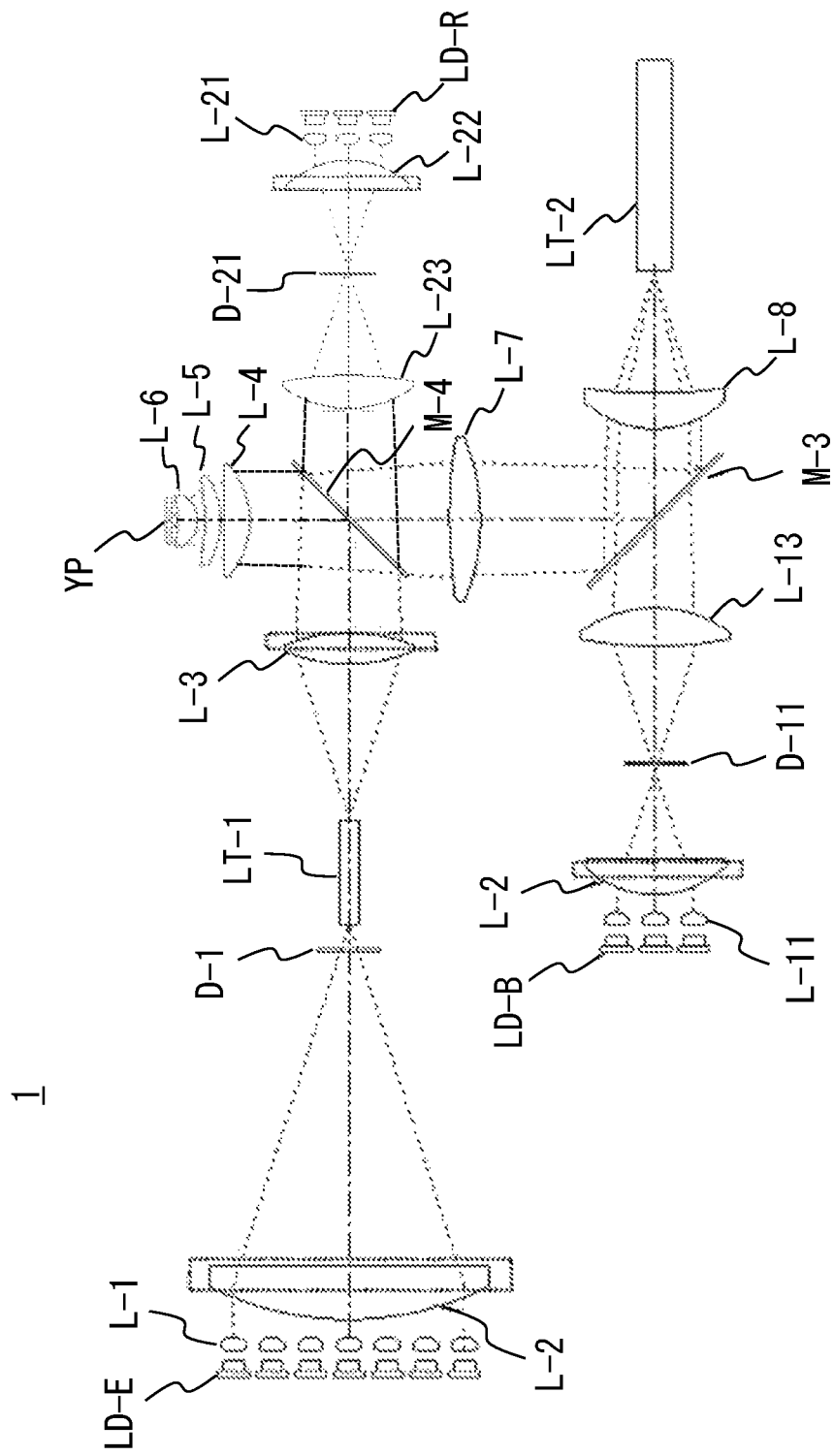
FIG. 7 is a configuration diagram showing a general configuration of a white light generation unit (light source device) according to a second exemplary embodiment.
Figure 8:
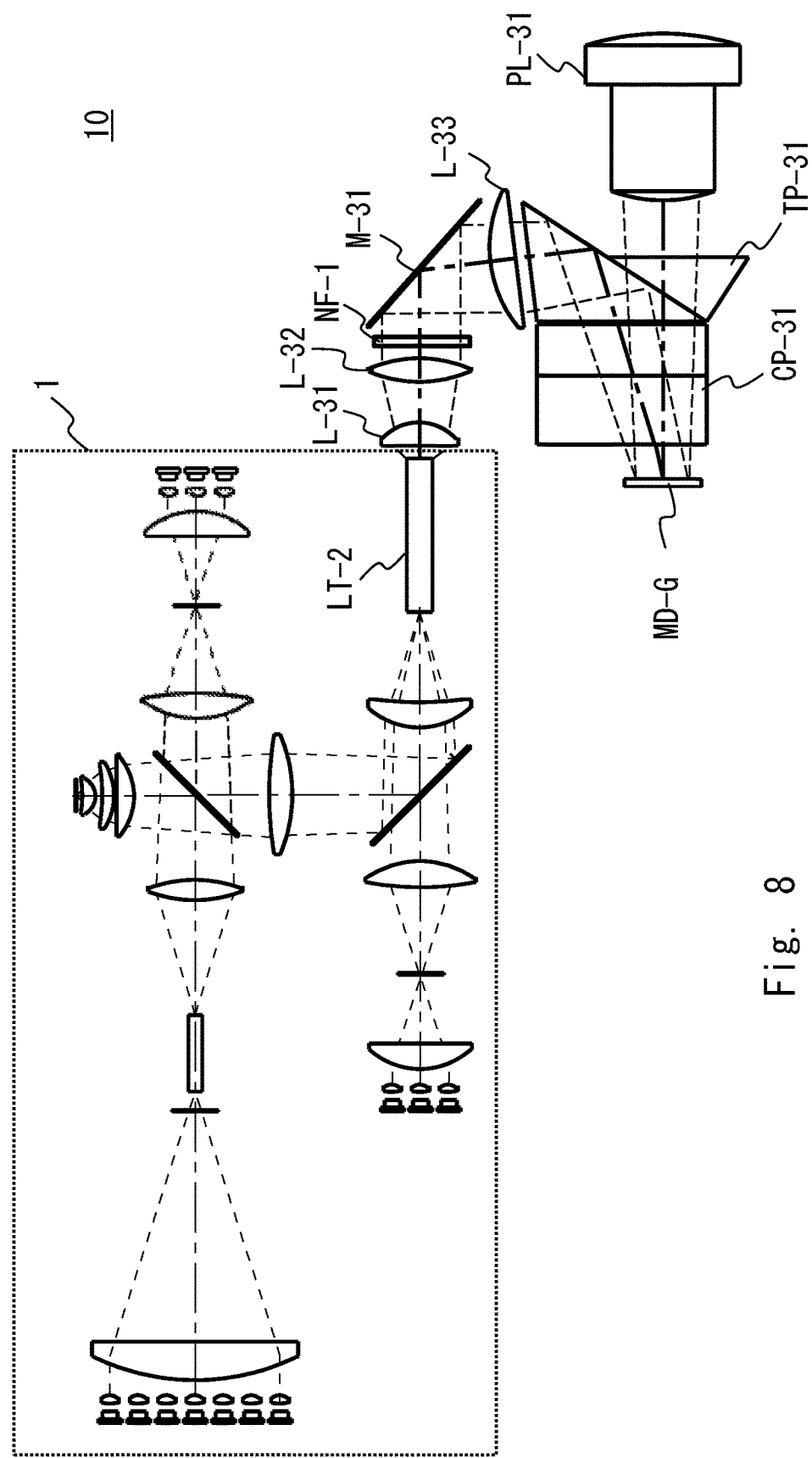
FIG. 8 is a configuration diagram sowing a general configuration of a projector according to the second exemplary embodiment.

A second exemplary embodiment is explained hereinafter with reference to the drawings. In this exemplary embodiment, an example where a trichroic mirror is used is explained. FIG. 7 shows a configuration example of a white light generation unit (light source device) according to this exemplary embodiment, and FIG. 8 shows a configuration example of a projector including this white light generation unit.

As shown in FIG. 7, the white light generation unit 1 according to this exemplary embodiment mainly includes, as a light source system for generating light of each color, blue laser diodes LD-Es, a phosphor YP, red laser diodes LD-Rs, and blue laser diodes LD-Bs. Further, the white light generation unit 1 includes, as a composite optical system for combining light from these components, a dichromic mirrors M-3 and a trichroic mirror M-4.

In comparison to the first exemplary embodiment, this exemplary embodiment includes the trichroic mirror M-4 in place of the dichromic mirrors M-1 and M-2. The rest of the configuration is similar to that of the first exemplary embodiment and therefore its explanation is omitted as appropriate.

That is, blue laser light emitted from the blue laser diodes LD-Es, which is a light source for excitation, passes through the lenses L-1 and L-2, the diffusion plate D-1, and the lens L-3, and is incident on the trichroic mirror M-4. Further, red laser light emitted from the red laser diodes LD-Rs passes through the lenses L-21 and L-22, the diffuser D-21, and the lens L-23, and is incident on the trichroic mirror M-4.

The trichroic mirror M-4 has a characteristic by which: blue color is reflected thereon; yellow color passes therethrough; and a red long-wavelength band is reflected thereon. Therefore, the wavelength band of the blue laser diodes LD-Es, which is the exciting light, is reflected on the trichroic mirror M-4; the wavelength band of the yellow light from the phosphor YP passes through the trichroic mirror M-4; and the wavelength band of the red light from the red laser diodes LD-Rs is reflected on the trichroic mirror M-4.

Figure 9:
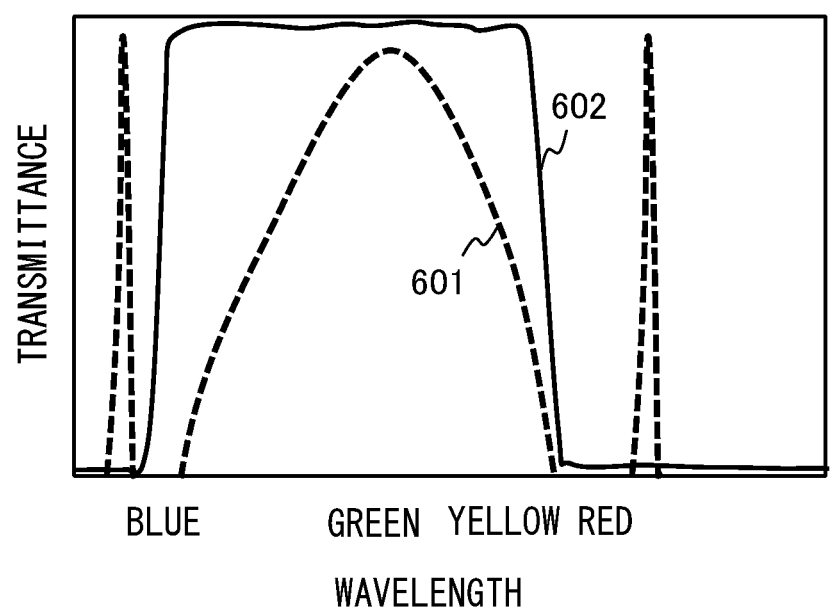
FIG. 9 is a graph showing characteristics of a trichroic mirror according to the second exemplary embodiment.

FIG. 9 shows spectral transmittances of the trichroic mirror M-4. In FIG. 9, a dotted line 601 indicates a spectral waveform of the exciting light LD-E, the YP fluorescence light, and the light LD-R, and a solid line 602 indicates spectral transmittances of the trichroic mirror M-4.

Therefore, the trichroic mirror M-4 reflects the blue laser light incident from the lens L-3 toward the phosphor YP. Further, the reflected light passes through the lenses L-4, L-5 and L-6 and illuminates the phosphor YP. The phosphor YP emits yellow light, which is excited by the blue light, to the trichroic mirror M-4 through the lenses L-6, L-5 and L-4. The trichroic mirror M-4 lets the yellow light from the phosphor YP pass therethrough in the first combining direction and reflects the red light incident from the lens L-23 toward the dichromic mirror M-3 (i.e., in the first combining direction). By doing so, the trichroic mirror M-4 combines the yellow light with the red light. The resultant light, in which the yellow light and the red light are combined, passes through the lens L-7 and is incident on the dichromic mirror M-3.

Blue laser light emitted from the blue laser diodes LD-Bs passes through the lenses L-11 and L-12, the diffuser D-11, and the lens L-13, and is incident on the dichromic mirror M-3. The dichromic mirror M-3 combines the blue light incident from the lens L-13 with the yellow light and red light incident from the lens L-7. Further, the resultant light becomes white light through the lens L-8 and the light tunnel LT-2, and hence the white light exits from the light tunnel LT2.

As shown in FIG. 8, similarly to the first exemplary embodiment, a projector 10 according to this exemplary embodiment mainly includes: the white light generation unit 1 shown in FIG. 7; a mirror M-31, a TIR prism TP-31, and a color prism CP31 that reflect and spectrally disperse the generated white light; a digital mirror device MD-G (and MD-R and MD-B) that generates image light from the spectrally-dispersed light; and a projection lens PL-31 that projects the generated image light.

That is, similarly to the first exemplary embodiment, the white light, which has exited from the light tunnel LT-2, passes through the lenses L-31 and L-32, and after a predetermined wavelength(s) is filtered out by the filter NF-1, is reflected on the mirror M-31. Then, the reflected light passes through the TIR prism TP-31 and the color prism CP-31 and is incident on the digital mirror devices MD-G, MD-R and MD-B. Further, the light reflected on the digital mirror devices MD-G, MD-R and MD-B passes through the color prism CP-31 and the TIR prism TP-31 and is projected from the projection lens PL-31 onto the screen in a magnified manner.

As described above, this exemplary embodiment includes the trichroic mirror M-4 in place of the dichromic mirrors M-1 and M-2 in the first exemplary embodiment. As a result, similarly to the first exemplary embodiment, it is possible to improve the energy efficiency, reduce the number of necessary components, and reduce the size of the apparatus.

Note that the present invention is not limited to the aforementioned exemplary embodiments and may be changed as appropriate without departing from the spirit of the present invention.

According to the present invention, it is possible to provide a light source device, a projection-type display device, and a light generation method capable of improve the energy efficiency.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A light source device comprising:
    a yellow phosphor that emits yellow fluorescence excited by exciting light;
    an exciting laser light source that emits blue exciting laser light as the exciting light;
    a red laser light source that emits red laser light;
    a first light combining unit that generates first composite light by combining the emitted yellow fluorescence with the emitted red laser light;
    a blue laser light source that emits blue laser light;
    a second light combining unit that generates second composite light by combining the combined first composite light with the emitted blue laser light; and
    a filter that filters out light having a predetermined wavelength from the combined second composite light,
    wherein the first light combining unit emits the emitted exciting laser light to the yellow phosphor and combines yellow fluorescence emitted in the yellow phosphor by the emitted exciting laser light with the red laser light, and
    wherein the first light combining unit comprises:
        a first dichromic mirror that reflects the emitted red laser light in a combining direction and lets the yellow fluorescence emitted from the yellow phosphor in the combining direction pass therethrough; and
        a second dichromic mirror that reflects the emitted exciting laser light toward the yellow phosphor and lets the red laser light and the yellow fluorescence from the first dichromic mirror pass therethrough in the combining direction.

2. The light source device according to claim 1, wherein the filter corrects the second composite light to a color specified for a digital cinema.

3. A light source device comprising:
    a yellow phosphor that emits yellow fluorescence excited by exciting light;
    an exciting laser light source that emits blue exciting laser light as the exciting light;
    a red laser light source that emits red laser light;
    a first light combining unit that generates first composite light by combining the emitted yellow fluorescence with the emitted red laser light;
    a blue laser light source that emits blue laser light;
    a second light combining unit that generates second composite light by combining the combined first composite light with the emitted blue laser light; and
    a filter that filters out light having a predetermined wavelength from the combined second composite light,
    wherein the first light combining unit emits the emitted exciting laser light to the yellow phosphor and combines yellow fluorescence emitted in the yellow phosphor by the emitted exciting laser light with the red laser light, and
    wherein the first light combining unit comprises a trichroic mirror that reflects the emitted exciting laser light toward the yellow phosphor, reflects the emitted red laser light in a combining direction, and lets the yellow fluorescence emitted from the yellow phosphor in the combining direction pass therethrough.

4. The light source device according to claim 3, wherein the filter corrects the second composite light to a color specified for a digital cinema.

5. A projection-type display device comprising:
    a yellow phosphor that emits yellow fluorescence excited by exciting light;
    an exciting laser light source that emits blue exciting laser light as the exciting light;
    a red laser light source that emits red laser light;
    a first light combining unit that generates first composite light by combining the emitted yellow fluorescence with the emitted red laser light;
    a blue laser light source that emits blue laser light;
    a second light combining unit that generates second composite light by combining the combined first composite light with the emitted blue laser light;
    a filter that filters out light having a predetermined wavelength from the combined second composite light; and
    a projection unit that projects image light based on light that has passed through the filter,
    wherein the first light combining unit emits the emitted exciting laser light to the yellow phosphor and combines yellow fluorescence emitted in the yellow phosphor by the emitted exciting laser light with the red laser light, and
    wherein the first light combining unit comprises:
        a first dichromic mirror that reflects the emitted red laser light in a combining direction and lets the yellow fluorescence emitted from the yellow phosphor in the combining direction pass therethrough; and
        a second dichromic mirror that reflects the emitted exciting laser light toward the yellow phosphor and lets the laser light and the yellow fluorescence from the first dichromic mirror pass therethrough in the combining direction.

6. A projection-type display device comprising:
    a yellow phosphor that emits yellow fluorescence excited by exciting light;
    an exciting laser light source that emits blue exciting laser light as the exciting light;
    a red laser light source that emits red laser light;
    a first light combining unit that generates first composite light by combining the emitted yellow fluorescence with the emitted red laser light;
    a blue laser light source that emits blue laser light;
    a second light combining unit that generates second composite light by combining the combined first composite light with the emitted blue laser light;
    a filter that filters out light having a predetermined wavelength from the combined second composite light; and
    a projection unit that projects image light based on light that has passed through the filter, wherein the first light combining unit emits the emitted exciting laser light to the yellow phosphor and combines yellow fluorescence emitted in the yellow phosphor by the emitted exciting laser light with the red laser light, and wherein the first light combining unit comprises a trichroic mirror that reflects the emitted exciting laser light toward the yellow phosphor, reflects the emitted red laser light in a combining direction, and lets the yellow fluorescence emitted from the yellow phosphor in the combining direction pass therethrough.

* * * * *